United States Patent
Lee et al.

(10) Patent No.: US 9,285,562 B2
(45) Date of Patent: Mar. 15, 2016

(54) ELECTROMAGNETIC DRIVING DEVICE FOR LENS HAVING AN ANTI-TILT MECHANISM

(71) Applicant: TDK Taiwan Corp., Taipei (TW)

(72) Inventors: Jin Yu Lee, Taoyuan County (TW); Cheng Kai Yu, Taoyuan County (TW)

(73) Assignee: TDK Taiwan Corp. (TW)

(*) Notice: Subject to any disclaimer, the term of this patent is extended or adjusted under 35 U.S.C. 154(b) by 189 days.

(21) Appl. No.: 13/872,916

(22) Filed: Apr. 29, 2013

(65) Prior Publication Data
US 2014/0146406 A1    May 29, 2014

(51) Int. Cl.
*G02B 7/02* (2006.01)
*G02B 7/08* (2006.01)

(52) U.S. Cl.
CPC ........................................ *G02B 7/08* (2013.01)

(58) Field of Classification Search
CPC .... G02B 27/646; G02B 13/009; G02B 7/022; G02B 7/028; G02B 23/2438; G02B 3/14; G02B 7/08; G02B 27/0955; G02B 6/4206; G02B 7/021; G02B 7/04; G02B 7/09; G02B 27/644; H04N 5/23248; H04N 5/23287; H04N 5/23264; H04N 5/2251; H04N 5/2253; H04N 5/2328; G06F 3/0304; G06F 3/0346; G11B 7/0933; G11B 7/0956; G11B 7/22; A61B 1/0019; G03B 2205/0046; G03B 2205/0069; G03B 2205/0007

See application file for complete search history.

(56) References Cited

U.S. PATENT DOCUMENTS

2008/0246353 A1   10/2008  Kuo et al.
2009/0303595 A1*  12/2009  Lim et al. ..................... 359/557

FOREIGN PATENT DOCUMENTS

| CN | 201477287 | 5/2010 |
| JP | 2004-20935 | 1/2004 |
| TW | 200700877 | 1/2007 |
| TW | 200830020 | 7/2008 |
| TW | 201207461 | 2/2012 |

OTHER PUBLICATIONS

Office Action for Taiwan application No. 10321572740.

* cited by examiner

*Primary Examiner* — Aliciai M Harrington

(57) ABSTRACT

An electromagnetic driving device defined with an X axis, a Y axis and a Z axis includes a casing, a frame, a driven object (e.g., a lens module), an anti-tilt mechanism and an electromagnetic driving module. The electromagnetic driving module includes at least one magnetic member, a coil and a circuit board. The frame connects to the casing so as to form an inner compartment therein. The driven object is received and movable along the Z axis inside the inner compartment. One of the magnetic member and the coil is fixed to the driven object while another thereof is fixed to the frame in such a corresponding manner that, when the coil is powered via the circuit board, the driven object would be moved linearly. By means of the anti-tilt mechanism, possible kinetic tilt caused by movements of the driven object upon when the driven object is driven to move along the Z axis can then be eliminated.

7 Claims, 19 Drawing Sheets cross section A-A cross section B-B cross section C-C cross section A-A cross section B-B cross section A-A cross section B-B

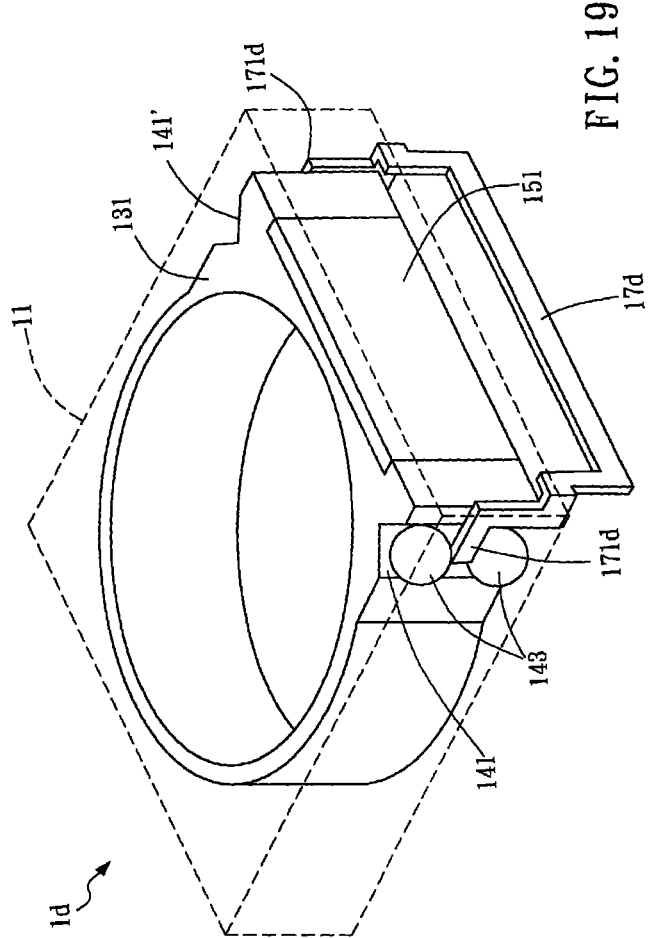

ELECTROMAGNETIC DRIVING DEVICE FOR LENS HAVING AN ANTI-TILT MECHANISM

BACKGROUND OF INVENTION

1. Field of the Invention

The invention relates to an electromagnetic driving device for lens having an anti-tilt mechanism, in which the anti-tilt mechanism can correct possible sideward tilt of the lens while in operation so as to stabilize movement of the lens.

2. Description of the Prior Art

Please refer to FIG. 1, in which a conventional zooming or focusing lens module is explodedly shown. In this conventional design, a mechanical transmission zooming mechanism 9 is utilized. The mechanism 9 uses a high-cost precision driving element 91 as its source power for a carrier 93 of the lens module 92 and a lot more transmission elements are involved in the mechanism 9. In the art, the aforesaid high-cost precision driving element 91 can be a step motor, a ultrasound motor, a piezoelectric actuator, and so on. Obvious disadvantages of such a mechanism 9 can be seen and well known in complicated structuring, tedious and difficult assembling, substantial occupation and high cost. Also, the mechanism 9 consumes a lot of energy during the operation.

In the early stage, the photography is quite professional, which involves manual photo detecting, manual focusing or zooming, and also manual reeling. Such a human-dependent art causes problems for green hands. In particular, while in a historical and un-repeated scene, a good timing for photography is usually missed for those ill-experienced photographers. Then, in 50's and 60's, machinery automation came in and made people believe that the automation would greatly change aspects in various consumer machineries. In the art of photography, the appearance of the auto photo detecting technique and the electrical reeling mechanism had proven that automation in photography was also possible. At that time, the red-hot auto-focusing system that led to a history-high photo-capturing speed was one of the flags for almost all the renowned camera manufacturers in the world.

Recently, it can be seen that the art of photography gears is focused in providing high-resolution images and, on the other hand, in providing a miniaturized design featuring in light weight, thin thickness, and handful size. It is clear that, in the era of having the camera as one of popular 3C products for ordinary amateur people, the cumbersome zooming lens module driven mechanically by the step-motor is now an obstacle for further miniaturizing the camera products.

At the same time, to replace the conventional step motor and to aim at reducing the volume of the driving mechanism of the lens module, an electronic VCM (Voice coil motor) feedback system is introduced to control the movement of the lens module. Also, integration work among various 3C products for enhancing the visual functions is also prosperous. Such work includes one of integrating the image-capturing function to the mobile communication product (for example, a cellular phone), the personal digital assistant (PDA), and/or the notebook computer.

Nevertheless, operations of all the above-mentioned portable products are limited to their own battery capacities. Hence, a topic and/or a research in providing the zooming or focusing lens module a new driving device that can feature in energy conservation while in operation and also in locating the lens module at a preferable position is definitely crucial to the art.

Furthermore, in all conventional driving devices for lens module, a guiding-mechanism is used to regulate linear back-and-forth movement of the lens module along a predetermined direction. To avoid possible jams or ragged movement of the lens module, appropriate tolerance (i.e. spacing) are inevitable between the movable parts and the stationery parts (for example the axial hole and the axial shaft); however, such space leads to a tilt problem for the lens module both in movement and in stops. The space would also affect the linearity and repeatability of controlling the lens module in positions along the photo axis. In particular, while the tolerance, the straightness, or the surface coarseness in holes is beyond the acceptable values, the image quality of the lens module and/or the precision positioning of the moving lens can be degraded. Apparently, the improvement of the aforesaid shortcomings for the lens driving module is definitely essential to the art.

SUMMARY OF THE INVENTION

Accordingly, it is the primary object of the present invention to provide an electromagnetic driving device for lens having an anti-tilt mechanism, in which the anti-tilt mechanism is used to further reduce the possible tilt of the driven parts during the movement. Thereby, spacing or backlash variance caused by the surface unevenness of the guiding-mechanism between the lens carrier and the casing can be substantially reduced, the straightness of the moving lens as well as the perpendicularity of the photo axial can be assured, the stability in displacement control can be increased, and also precision positioning for the moving lens can be achieved.

In the present invention, the electromagnetic driving device for lens having an anti-tilt mechanism defined with an X axis, a Y axis and a Z axis comprises a casing, a frame, a driven object (e.g., a lens module), an anti-tilt mechanism and an electromagnetic driving module. The electromagnetic driving module includes at least one magnetic member and at least one coil.

The frame coated tightly by the casing so as to form a compact inner compartment inside the frame. The driven object is received and movable along the Z axis inside the inner compartment. The anti-tilt mechanism is to provide a lateral horizontal push or pull on an X-Y surface to the driven object so as to restrain the horizontal or rotational movement of the driven object, and thereby the X-axial and/or Y-axial gap or spacing around the driven object inside the inner compartment can be eliminated. The magnetic member is fixed to the driven object, and the corresponding coil is fixed to the frame. With the magnetic force provided by the magnetic member and the pairing coil, the driven object can then be moved inside the inner compartment. Through the anti-tilt mechanism to provide a predetermined sideward force, possible kinetic tilt caused by the gap or spacing between the driven object and the casing when the driven object is driven to move along the Z axis inside the inner compartment will be eliminated.

All these objects are achieved by the electromagnetic driving device for lens having an anti-tilt mechanism described below.

BRIEF DESCRIPTION OF THE DRAWINGS

The present invention will now be specified with reference to its preferred embodiment illustrated in the drawings, in which:

FIG. 19 shows a schematic application state of the constraint members of a fifth embodiment of the electromagnetic driving device for lens having an anti-tilt mechanism in accordance with the present invention.

DESCRIPTION OF THE PREFERRED EMBODIMENT

Figure 1:
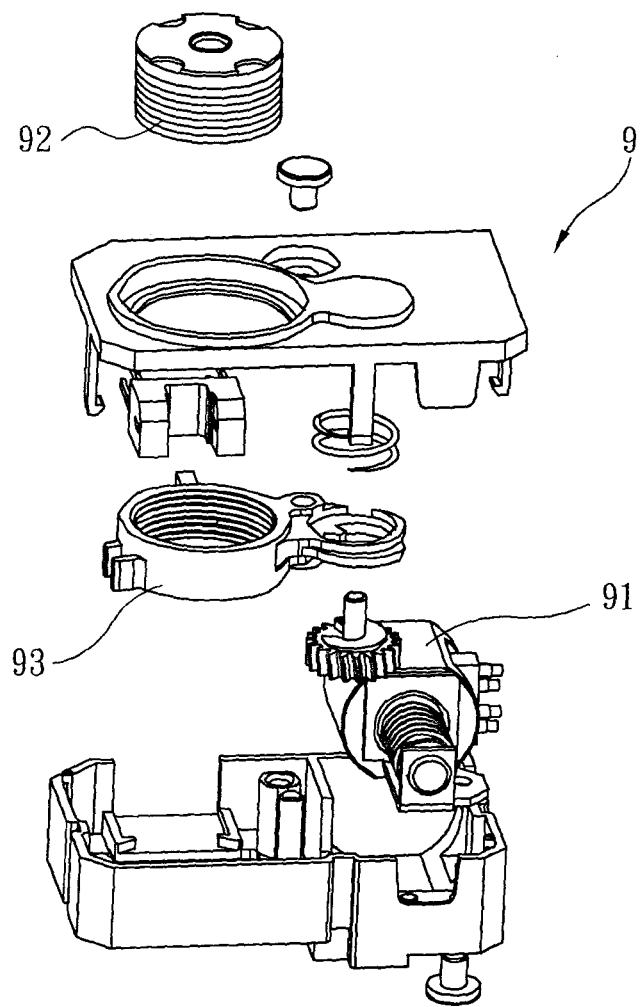
FIG. 1 is a schematic exploded view of a conventional zooming/focusing lens module.

The invention disclosed herein is directed to an electromagnetic driving device for lens having an anti-tilt mechanism. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Referring now to FIG. 2, FIG. 3, FIG. 4, FIG. 5, FIG. 6 and FIG. 7, an exploded view, a top view, a left-hand side view, a cross-sectional view along line A-A, a cross-sectional view along line B-B and a cross-sectional view along line C-C of a first embodiment of the electromagnetic driving device 1 for lens having an anti-tilt mechanism are shown, respectively. The electromagnetic driving device 1 defined with an X axis, a Y axis and a Z axis includes a casing 11, a frame 12, a driven object 13, an anti-tilt mechanism 14, an electromagnetic driving module 15 and a position-detecting module 16. The casing 11 houses the frame 12 so as to form, inside the frame 12, a compact inner compartment 110. The driven object 13 received inside the inner compartment 110 is movable along the Z axis in the casing 11. In this first embodiment of the present invention, the position-detecting module 16 is embodied a Hall element. However, in other embodiments not shown herein, the position-detecting module 16 can be a magneto-resistive sensor, an optical position sensor, or any position sensor the like.

As shown, the casing 11 formed as a hollow square dome having a central penetration hole 111 is to house the frame 12 in a manner of skin-coating and structure-supporting. An elastic pre-stress structure 144 is introduced to firmly engage the exterior casing 11 and the interior frame 12. An inner compartment 110 thus formed inside the frame 12 is to accommodate the lens module 13. An accommodation notch 121 and a recess portion 124 are located respectively at corresponding predetermined locations at two lateral sides of the frame 12. The accommodation notch 121 is provided to install the coil 152 which is to pair with the magnetic member 151 located exteriorly at the driven object 13 (the lens module for example). In this structure, the driven object or the lens module 13 inside the inner compartment 110 is capable to capture the image through the central penetration hole 111.

In the first embodiment of the present invention, the driven object 13 is embodied as a lens module (thereinafter equally for the aforesaid driven object). The lens module 13 further includes a lens carrier 131 and a lens 132. The lens 132 located at a center of the lens carrier 131 is moved synchronically with the lens carrier 131. The anti-tilt mechanism 14 is to provide a lateral horizontal push or pull force (in particular, a fixed lateral forcing) on an X-Y surface to the lens module 13 so as to allow only horizontal or rotational movement thereabout for the driven object 13, and thereby the X-axial and/or Y-axial gap, backlash or spacing around the lens module 13 inside the compartment 110 can be substantially eliminated so as further to reduce the possibility and the scale of the kinetic tilt to a satisfied extent.

The anti-tilt mechanism 14 further includes a pair of groove 141, 141' located respectively by a predetermined spacing at the rim of the lens carrier 131 of the lens module 13, a constraint block 142 located interiorly at the frame 12 at a position to face one of the slippery groove 141 of the lens carrier 131, a plurality of rolling members 143 (four into two pairs as shown) and the elastic pre-stress structure 144. A pair of the rolling members 143 is restrained to move inside a longitudinal Z-axial channel formed between the groove 141 and the constraint block 142, while another pair of the rolling members 143 is restrained to move inside another longitudinal Z-axial channel formed between another groove 141' and the elastic pre-stress structure 144. Upon such an arrangement, the lens carrier 131 can thus shift along the Z axis with respect to the frame 12 inside the inner compartment 110. In this embodiment, the rolling members 143 are preferred embodied as four rolling balls. Yet, in other embodiments, the rolling members 143 can also be rolling pins, slippery rods, or relevant-contoured cams.

Figure 2:
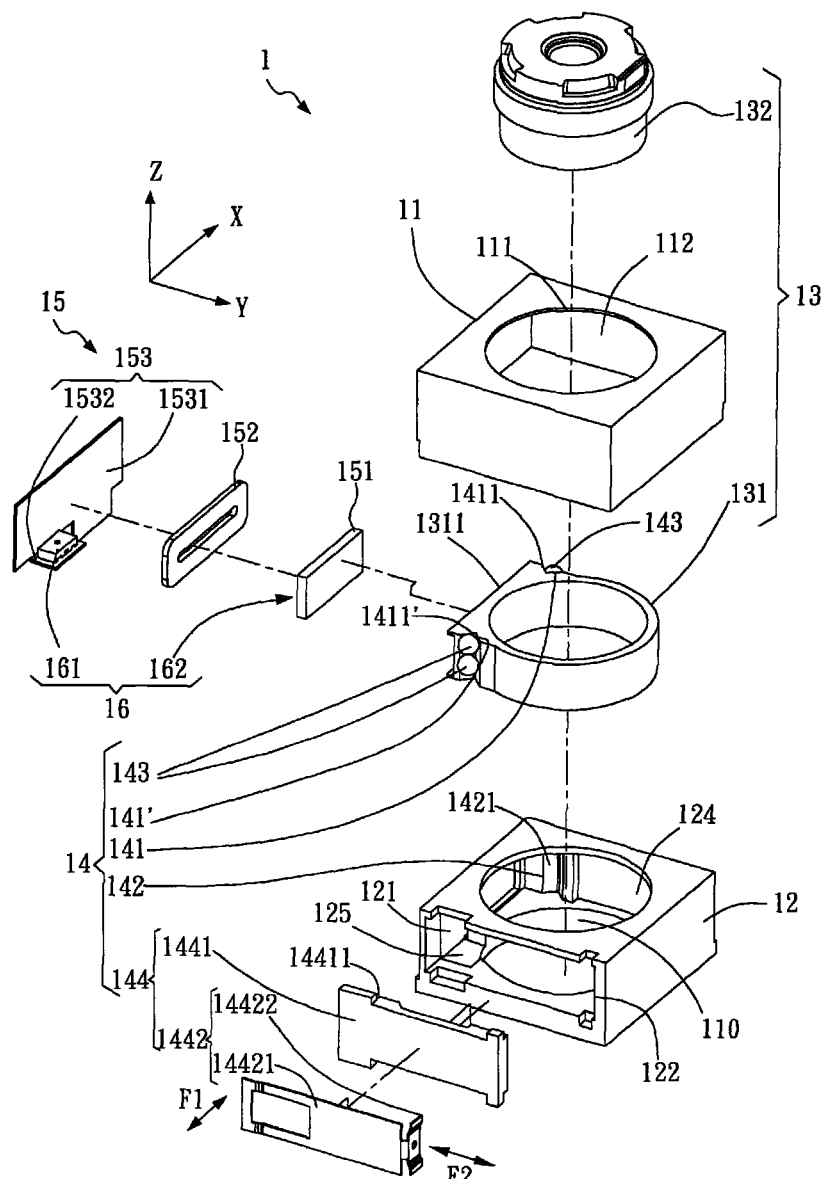
FIG. 2 is a schematic exploded view of a first embodiment of the electromagnetic driving device for lens having an anti-tilt mechanism in accordance with the present invention.
Figure 3:
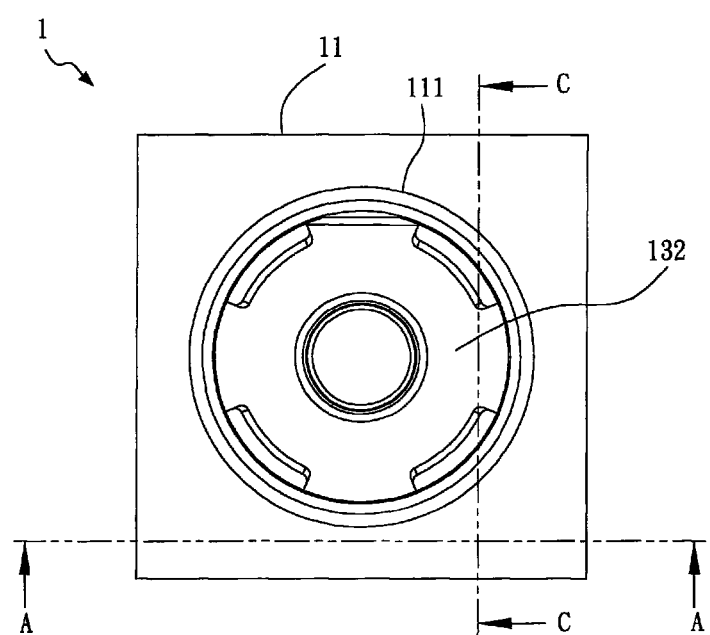
FIG. 3 is a top view of the electromagnetic driving device of FIG. 2.
Figure 4:
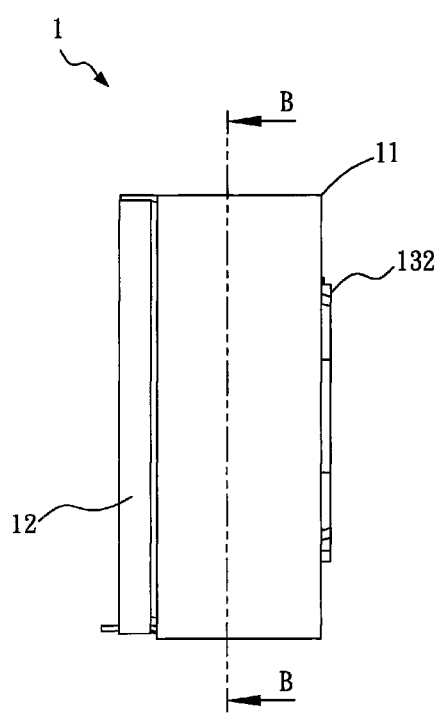
FIG. 4 is a left-hand side view of the electromagnetic driving device of FIG. 2.
Figure 5:
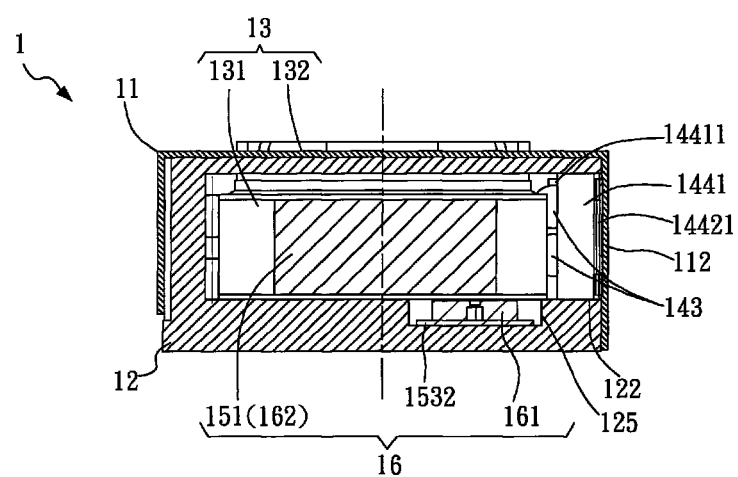
FIG. 5 is a schematic cross-sectional view of the electromagnetic driving device of FIG. 2 along line A-A.

The elastic pre-stress structure 144 of the present invention includes a loosen-fit backing structure 1441 and a spring component 1442. In this embodiment as shown in FIG. 2, the spring component 1442 formed as an L-shaped elastic plate further includes an X-directional spring plate 14421 and a Y-directional spring plate 14422 extending perpendicular to the X-directional spring plate 14421 so as to form the L shape of the spring component 1442. With both the X-directional spring plate 14421 and the Y-directional spring plate 14422 to contact elastically at the loosen-fit backing structure 1441 so as to eliminate the X-axial and Y-axial gaps between the lens module 13 and the frame 12, the goal of reducing possible kinetic tilt for the lens module 13 can thus be achieved. Details about the mechanism of the elastic pre-stress structure 144 to obtain this advantage are elucidated below.

In this embodiment, the loosen-fit backing structure 1441 is loosely fit into an opening 122 of the frame 12 by a predetermined backlash, in which the opening 122 is to communicate in space the inner compartment 110 to the outer space of the frame 12. The loosen-fit backing structure 1441 further has a groove 14411 respective to the groove 141' of the lens carrier 131 of the lens module 13. In the present invention, the groove 14411 can be one of a V-shaped race and a U-shape race. The X-directional spring plate 14421 is located in the slim space between the inner loosen-fit backing structure 1441 and the outer casing 11. The Y-directional spring plate 1442 is extended into the predetermined backlash at one side of the opening 122 and between the loosen-fit backing structure 1441 and the frame 12. Upon the groove 14411 and the pairing slippery groove 141' to form the longitudinal Z-axial channel for the rolling members 143 to roll along thereinside, the X-directional spring plate 14421 of the spring component 1442 can then exert a force to depress the loosen-fit backing structure 1441 onto the lens module 13. At the same time, with the Y-directional spring plate 14422 inside the opening 122 to elastically space the loosen-fit backing structure 1441 and the frame 12, possible manufacturing tolerances between two said longitudinal Z-axial channels (i.e. misaligning the contact surface 1411 of the groove 141 and the corresponding should-be-parallel contact surface 1411' of the slippery groove 141') can thus be reduced. Upon such an arrangement, possible kinetic tilt of the lens module 13 along the X-axial or Y-axial direction while moving along the Z-axial direction inside the inner compartment 110 can thus be eliminated.

Namely, the X-directional spring plate 14421 of the spring component 1442 is to contact at an inner surface 112 of the casing 11 so as to generate an elastic normal reaction F1 onto the loose-fit backing structure 1441 for further depressing the rolling members 143 against the groove 141' of the lens carrier 131. On the other hand, the Y-directional spring plate 14422 of the spring plat 1442 is to insert into the predetermined space of the opening 122 between the loosen-fit backing structure 1441 and the frame 12 in a manner of having one side thereof to contact the loosen-fit backing structure 1441 while the opposing side thereof to contact the lateral wall of the opening 122. Thereby, the Y-directional spring plate 14422 can provide another elastic reaction F2 to elastically locate the loosen-fit backing structure 1441 inside the opening 122. Also, through dynamically adjusting the contacting of the rolling members 143 between the groove 141' and the groove 14411 by the elastic-fitting loosen-fit backing structure 1441, possible kinetic tilt of the lens module 13 along the X-axial or Y-axial direction while moving along the Z-axial direction inside the inner compartment 110 can thus be reduced.

The electromagnetic driving module 15 includes at least a magnetic member 151, a coil 151 and a circuit board 153. The circuit board 153 which can be flexibly formed as an L-shaped circuit board is attached to a side wall of the frame 12 and an extension part of the circuit board can be used to shield the accommodation notch 121 (housing the coil 152) of the frame 12. In a preferred embodiment, the circuit board 153 is originally made in a flat-plate form, and then, the extension part of the circuit board 153 is bended for 90 degrees in order to form the L-shaped circuit board 153. The circuit board 153 further includes a coil-layout portion 1531 (e.g., the extension part of the circuit board 153) and a detection-layout portion 1532, in which the coil-layout portion 1531 is formed as a perpendicular bent-up protrusion of the plane detection-layout portion 1532. It is noted that, although the area and size of the coil-layout portion 1531 is larger than the detection-layout portion 1532 in FIG. 2, it is possible to modify the coil-layout portion 1531 into two contacting pins of the coil 152 and thus is smaller than the detection-layout portion 1532. In the first embodiment as shown, the L-shaped circuit board 153 is formed by posing the coil-layout portion 1531 on an X-Z surface and the detection-layout portion 1532 on an X-Y surface perpendicular to the X-Z surface. The coil-layout portion 1531 and the detection-layout portion 1532 are to mount and couple electrically the coil 152 and the position-detecting module 16, respectively. In particular, the position-detecting module 16 located on the detection-layout portion 1532 as shown in FIG. 2 is to be inserted into a detector room 125 pre-built in the frame 12 at a location corresponding to a target 162 set at the lens carrier 13. In this embodiment, the target 162 is the bottom surface of the magnetic member 151.

The magnetic member 151 is located at the lens module 13 at a position in respect to the coil 152 mounted on the circuit board 153. In this first embodiment, one magnetic member 151 is to pair one corresponding coil 152. In addition, the coil 152, electrically coupled to the circuit board 153, and the magnetic member 151 are located inside the accommodation notch 121 of the frame 12 and an exterior surface 1311 of the lens module 13. In the present invention, the magnetic member 151 can be a permanent magnet. By providing the electromagnetic driving lens device 1 according to the present invention, the conventional magnetic Yoke design can be waived. Thereby, a further miniaturization upon the whole machinery can be possible, and the volume occupation can be further reduced. Also, introduction of the magnetic member 151 and the pairing coil 152 to drive the lens carrier 131 to shift along the Z-axial direction can reduce the motional backlashes or spacing between contacting parts while the lens is in motion, and thus kinetic tilt of the moving lens module 13 or any moving part can be reduced to a minimum.

In the present invention, the circuit board 153 applies predetermined currents with different directions to the coil 152 so as to generate a corresponding electromagnetic field with varying magnetic directions, and thereupon the corresponding magnetic member 151 can thus be moved according to the changes of the electromagnetic field of the coil 152. The movement of the magnetic member 151, either being pushed or being pulled, can then synchronically shift the lens carrier 131 along a corresponding Z-axial direction inside the inner compartment 110. Thereby, the lens 132 inside the lens carrier 131 can then perform zooming and/or focusing according to the back-and-forth Z-axial motion inside the inner compartment 110.

In the present invention, though in this embodiment the driving module for driving the driven object 13 (the lens module) to shift back and forth along the Z-axial direction is an electromagnetic driving module 15 consisted of the magnetic member 151 (the permanent magnet) and the coil 152, yet in other embodiments the driving module can also be formed as a driving mechanism having piezoelectric or expandable electro-thermal elements.

The position-detecting module 16 further includes a position detector 161 and a target 162. In this embodiment, the position detector 161 can be a magneto-resistive sensor (a Hall element for example) structurally fixed and electrically coupled to the detection-layout portion 1532 of the circuit board 153 at a position respective to the target 162 mounted exteriorly to the lens carrier 131. The displacement of the lens module 13 inside the inner compartment 110 is detected by the position detector 161. Preferably, in this embodiment, the magnetic member 151 on the lens carrier 131 can serve as the target 162. Through the position-detecting module 16 (the magneto-resistive sensor) to detect the position of the magnetic member 151 inside the inner compartment 110, the Z-axial displacement of the lens module 13 can be thus computed.

In addition, in a further embodiment of the present invention (not shown herein), the position detector 161 can be an optical position sensor (a photo-sensing resistive transmitter for example). In such an embodiment, the optical position detector (i.e., the position detector 161) is located at the casing 11, and a corresponding reflector (the target 162) is located exteriorly to the lens carrier 131 at a position with respect to the optical position detector (the position detector 161). Upon such an arrangement, the displacement or position of the lens module 13 can also be detected.

Figure 6:
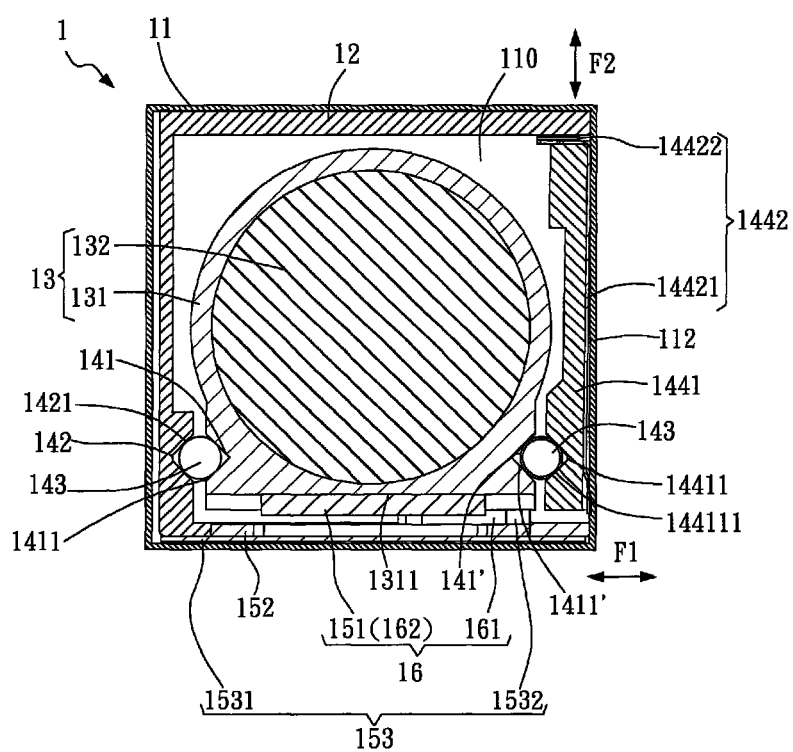
FIG. 6 is a schematic cross-sectional view of the electromagnetic driving device of FIG. 2 along line B-B.
Figure 7:
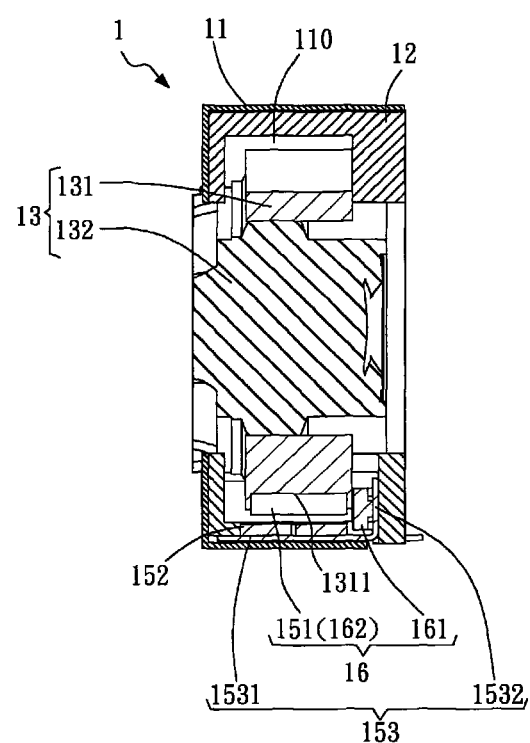
FIG. 7 is a schematic cross-sectional view of the electromagnetic driving device of FIG. 2 along line C-C.
Figure 8:
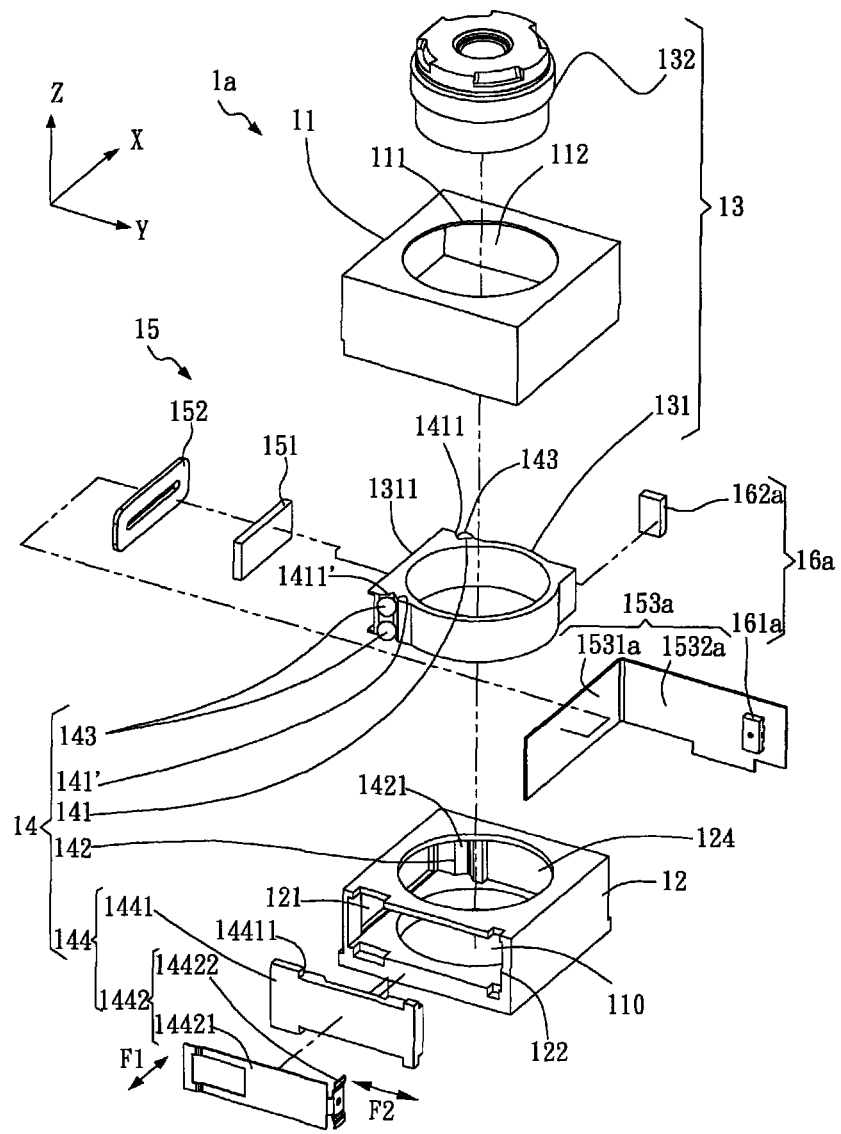
FIG. 8 is a schematic exploded view of a second embodiment of the electromagnetic driving device for lens having an anti-tilt mechanism in accordance with the present invention.
Figure 9:
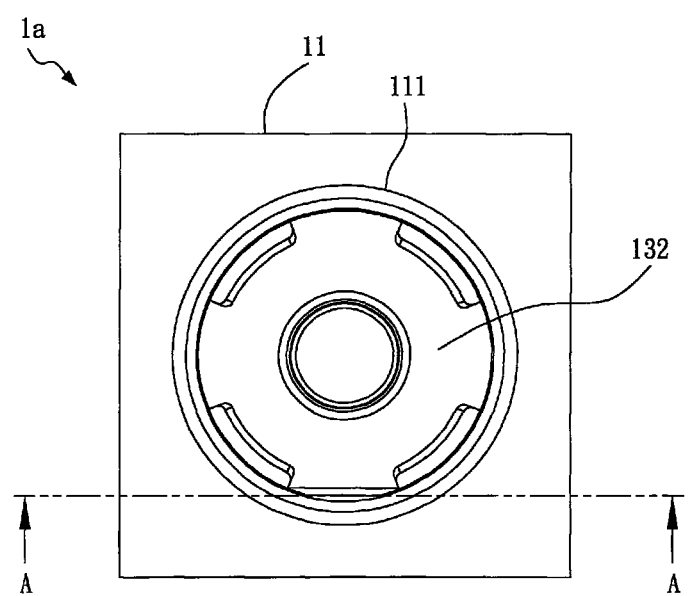
FIG. 9 is a top view of the electromagnetic driving device of FIG. 8.
Figure 10:
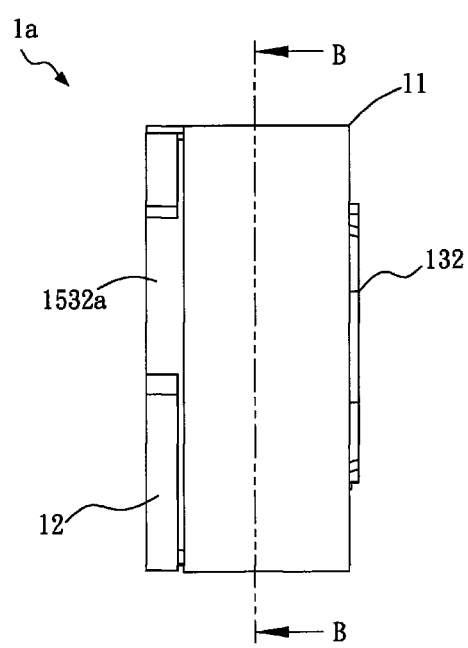
FIG. 10 is a left-hand side view of the electromagnetic driving device of FIG. 8.
Figure 11:
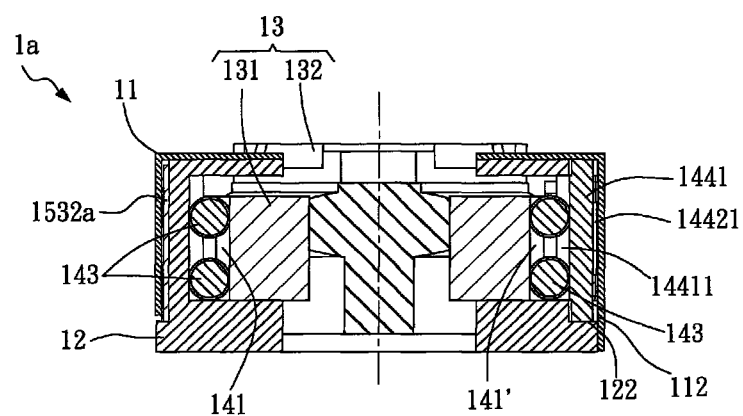
FIG. 11 is a schematic cross-sectional view of the electromagnetic driving device of FIG. 8 along line A-A.
Figure 12:
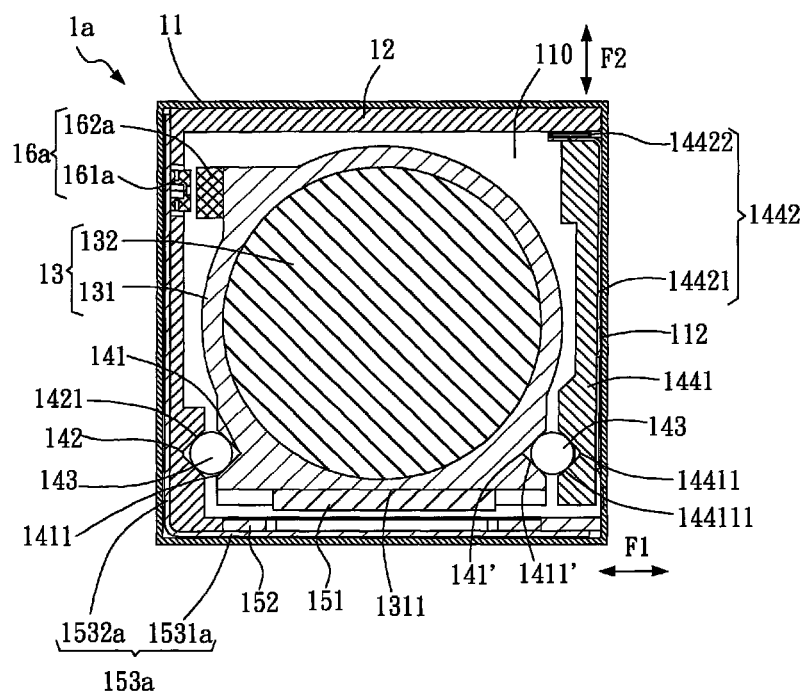
FIG. 12 is a schematic cross-sectional view of the electromagnetic driving device of FIG. 8 along line B-B.
Figure 13:
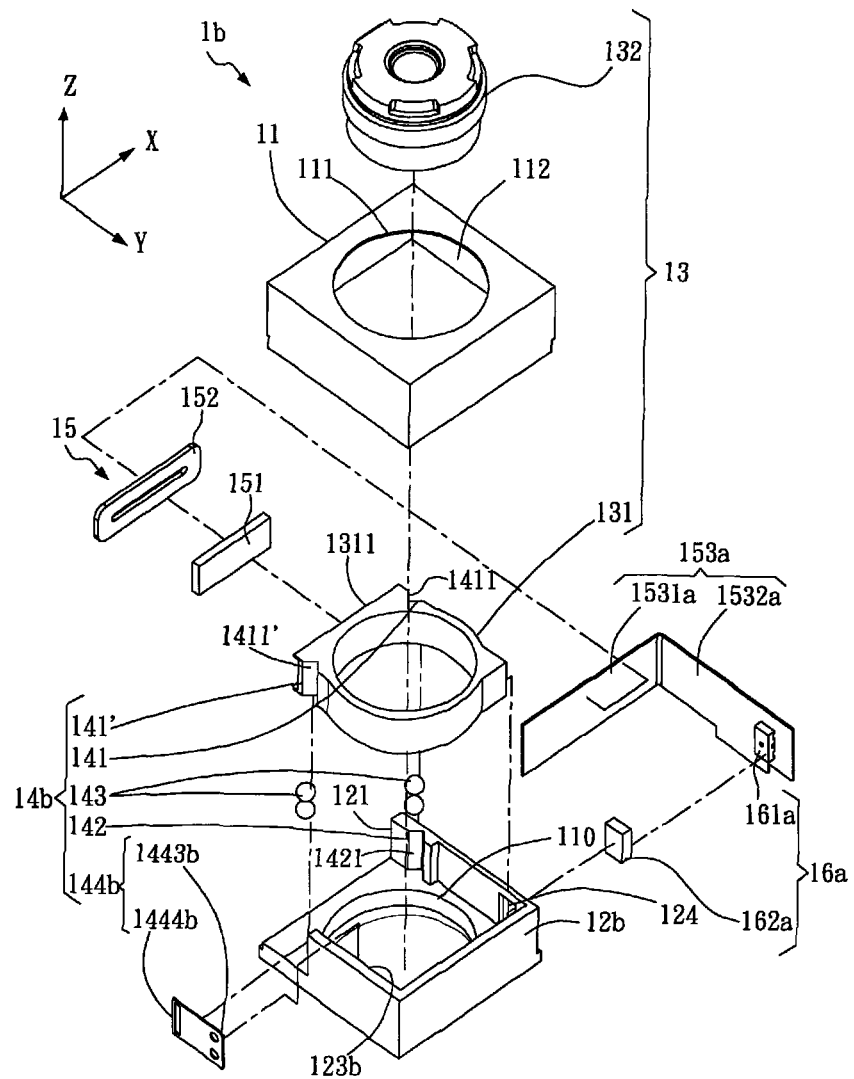
FIG. 13 is a schematic exploded view of a third embodiment of the electromagnetic driving device for lens having an anti-tilt mechanism in accordance with the present invention.
Figure 14:
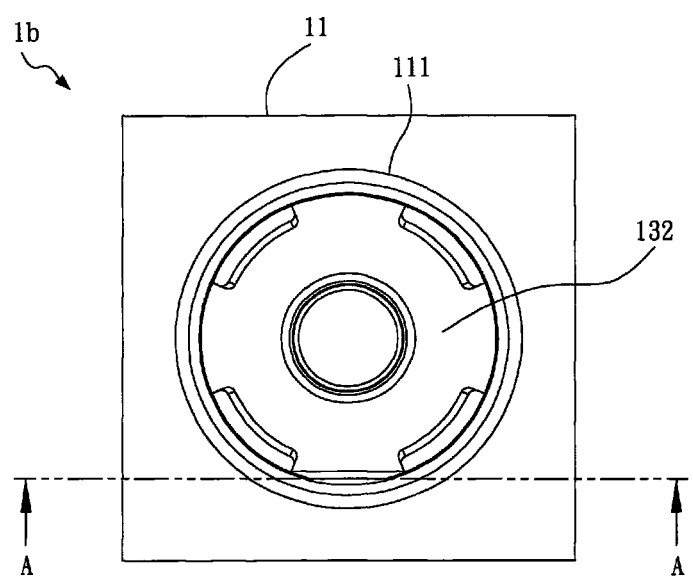
FIG. 14 is a top view of the electromagnetic driving device of FIG. 13.
Figure 15:
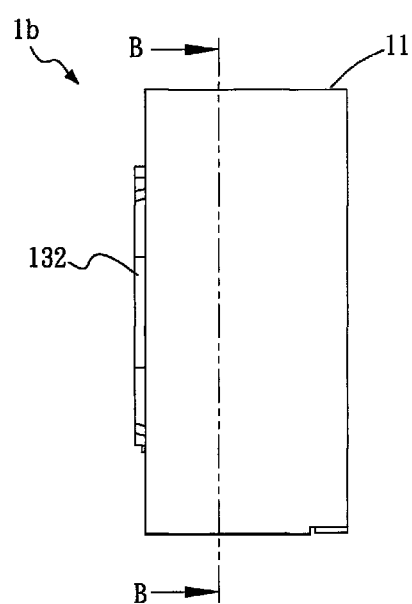
FIG. 15 is a right-hand side view of the electromagnetic driving device of FIG. 13.
Figure 16:
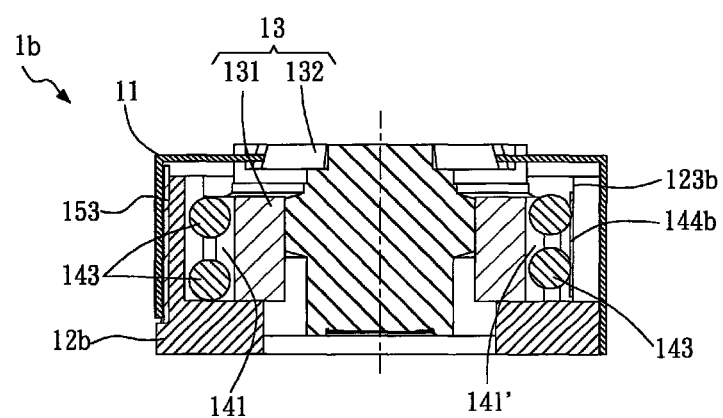
FIG. 16 is a schematic cross-sectional view of the electromagnetic driving device of FIG. 13 along line A-A.
Figure 17:
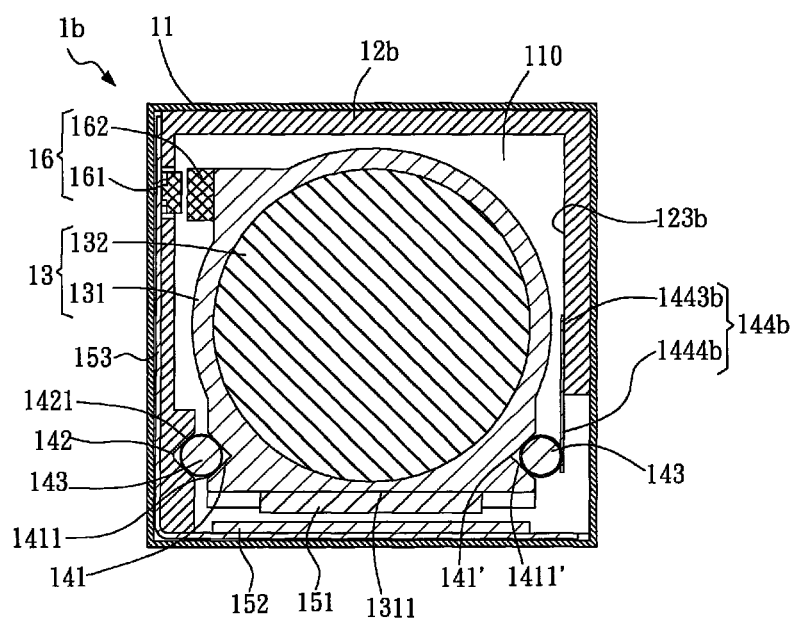
FIG. 17 is a schematic cross-sectional view of the electromagnetic driving device of FIG. 13 along line B-B.

In the present invention, the slippery groove 141, 141' of the anti-tilt mechanism 14 can be V-shape race or U-shape race. In this embodiment as shown in FIG. 6, the groove 141, 141' are formed as V-shape race. The constraint block 142 integrally formed as a single piece with the frame 12 has a V-shape cross section, easier to be observed by a top view. Inside the constraint block 142, a V-shape groove to provide a V-shape inner contact surface 1421 is formed to face the groove 141. By providing the rolling members 143 to roll in the longitudinal Z-axial channel formed by the groove 141 and the constraint block 142, possible X-axial and/or Y-axial tilt, while the lens module 13 undergoes the Z-axial motion inside the inner compartment 110, can thus be substantially compensated, or preferably eliminated.

In the first embodiment of the present invention, the rolling member 143 can be embodied as a rolling ball, and two rolling balls 143 are served in each of two aforesaid longitudinal Z-axial channels. Namely, in the case that the groove 141, 141' are both formed as individual opposing V-shape race, the corresponding rolling members 143 (rolling balls, two at each side) can be restrained by feeding between the V-shape contact surfaces 1411, 1411' of the corresponding groove 141, 141' and respectively a concave V-shape contact surface 1421 of the constraint block 142 and another concave V-shape contact surface 144111 inner on the groove 14411 of the loosen-fit backing structure 1441. Upon such an arrangement, while the lens module 13 performs the Z-axial displacement inside the inner compartment 110 through the rolling of the rolling members 143 inside the corresponding longitudinal Z-axial channels, possible kinetic tilt of the lens module 13 generated from the Z-axial movement of the lens carrier 131 inside the inner compartment 110 can thus be compensated or evenly be eliminated. Of course, in other embodiments of the present invention but not shown herein, the aforesaid V-shape contact surfaces 1411, 1411' or the respective V-shape contact surfaces 1421, 144111 can be alternatively formed as concave U-shape or arbitrary relevant-shaped structures that can serve accommodation and guide purposes for the rolling members 143 of the present invention.

It is well known in the art that backlashes and manufacturing tolerances are inevitable and also necessary in considering relative mobility between the lens module 13 and the frame 12. Somehow, such a necessity becomes the main reason to induce micro-oscillations and kinetic tilt to the moving lens module 13. In the present invention, by providing special mechanism designs in forming a longitudinal Z-axial channel to roll the rolling members 143 by pairing the groove 141 and the constraint block 142 and another longitudinal Z-axial channel to roll also the rolling members 143 by pairing another groove 141' and the elastic pre-stress structure 144, the Z-axial displacement of the lens module 13 with respect to the frame 12 can be performed by the electromagnetic driving module 15 driving the lens module 13 to slide through the movement of the rolling members 143 between the movable V-shape contact surface 1411 and the corresponding fixed V-shape contact surface 1421, and also between the movable V-shape contact surface 1411' and the corresponding elastic V-shape contact surface 144111. By providing the elastic pre-stress structure 144 to one side of the aforesaid mechanism designs, the contact points of the rolling members 143 inside the respective longitudinal Z-axial channels can thus be flexibly self-adjusted so as to reduce possible spacing caused by un-even contact surfaces and so as to eliminate micro-oscillations and kinetic tilt on the lens carrier 131, and thereby a stable movement of the lens module 13 along the Z-axial direction can thus be achieved. For the backlashes and the tolerant spacing are usually small that the imaging quality of the lens module 13, either in zooming or in focusing, can maintain in the better level if and only if the kinetic tilt is absent as the contribution of the present invention claims.

In the foregoing description, the existence of the backlashes or the tolerant spacing would cause micro oscillations of the lens carrier 131 while moving along the Z-axial direction inside the inner compartment 110. Such the micro oscillations are the reasons for the so-called kinetic tilt. The kinetic tilt would influence the angle between the lens module 13 and the image sensor module located under the lens module 13. If the angle in between exceeds an acceptable value, the image quality will be deteriorated. In particular, to meet a high-resolution or high pixel value requirement, the tolerance for the acceptable angle between the lens module 13 and the image sensor module is usually within 10 arc minutes (1 degree=60 arc minutes). Conventionally, the tilt angle can only be controlled to a value around 10 arc minutes (0.167 degree). Obviously, by applying the electromagnetic driving device for lens having an anti-tilt mechanism in accordance with the present invention, the kinetic tilt angle between the lens module 13 and the image-detecting module can be controlled to a value below 6 arc minutes (i.e., 0.1 degree). Accordingly, the influence of the kinetic tilt upon the imaging can be substantially reduced, and thus the higher image quality can be satisfied when performing the image-capturing.

In the following description, four more embodiments of the present invention are disclosed. For most of the elements of the following embodiments are resembled to those of the first embodiment as described above, the same names and numbers would be directly assigned to those elements that have been described in the first embodiment. For those elements of the following two embodiments that are slightly different to the corresponding elements in the first embodiment, a tailing English letter will be added to the respective numbers though the same names and numbers are still given. Details of function and structure for those elements of the following four embodiments that are totally resembled to or slightly different to the corresponding elements in the first embodiment are omitted herein.

Referring now to FIG. 8, FIG. 9, FIG. 10, FIG. 11 and FIG. 12, an exploded view, a top view, a left-hand side view, a cross-sectional view along line A-A and a cross-sectional view along line B-B of a second embodiment of the electromagnetic driving device for lens having an anti-tilt mechanism are shown, respectively. By comparing this second embodiment in FIG. 8 to the aforesaid first embodiment in FIG. 2, it is shown that the second embodiment is almost the same as the first embodiment, and thus elements of the second embodiment which are the same as those of the first embodiment would be omitted herein. The major difference between the first embodiment 1 of FIG. 2-FIG. 7 and the second embodiment 1a of FIG. 8-FIG. 12 is that, in this second embodiment 1a, the L-shape circuit board 153a is formed by bending an extension part of a flat-plate typed circuit board into the L-shape circuit board 153a in such a manner that, the coil-layout portion 1531a located at the bended extension part is extending along a negative X-axial direction and the detection-layout portion 1532a is extending along a positive Y-axial direction. Upon such an arrangement, the total height (in the Z-axial direction) of the lens module 13 can be substantially reduced. It is once again noted that, although the area and size of the coil-layout portion 1531a is similar than the detection-layout portion 1532a in FIG. 8, it is possible to modify the coil-layout portion 1531a into two contacting pins of the coil 152 and thus is smaller than the detection-layout portion 1532a.

The coil-layout portion 1531a of the circuit board 153a is to cover by blocking thereupon the accommodation notch 121 of the frame 12 (from the right-hand side of the frame 12 in FIG. 8), while the detection-layout portion 1532a is to block the recess portion 124 of the frame 12. In the present invention, the coil-layout portion 1531a and the detection-layout portion 1532a are respectively to mount on and also couple electrically with the coil 152 and the position detector 161a of the position-detecting module 16a. Further, through the recess portion 124, the position detector 161a can thus see the target 162a located on the lens carrier 131. With the fixed position detector 161a to sense the target 162a synchronically moved with the lens carrier 131, the Z-axial displacement of the lens module 13 inside the inner compartment 110 can then be precisely calculated.

Referring now to FIG. 13, FIG. 14, FIG. 15, FIG. 16 and FIG. 17, an exploded view, a top view, a right-hand side view, a cross-sectional view along line A-A and a cross-sectional view along line B-B of a third embodiment of the electromagnetic driving device for lens having an anti-tilt mechanism are shown, respectively. By comparing FIG. 13 to FIG. 8, it is shown that the third embodiment is mostly resembled to the second embodiment, and thus elements of the third embodiment which are the same as those of the second embodiment would be omitted herein.

The major difference between the second embodiment 1a of FIG. 8-FIG. 12 and the third embodiment 1b of FIG. 13-FIG. 17 is that, in this third embodiment 1b, the anti-tilt mechanism 14b further includes an elastic pre-stress structure 144b formed as a unique elastomer. In this third embodiment, the elastic pre-stress structure 144b can be a spring metal plate having one end 1443b (the fixation end) fixed to an inner rim 123b of the frame 12b and another end 1444b (the spring end) to elastically depress the rolling members 143 into the groove 141' of the lens carrier 131 (i.e., to elastically depress the rolling members 143 against the V-shape contact surface 1411' of the groove 141'). Upon such an arrangement, the kinetic tilt can be eliminated, the photo direction for the lens module 13 to move along can be corrected, and thus the lens module 13 can then ride the rolling members 143 to move smoothly along the Z-axial direction inside the inner compartment 110.

Figure 18:
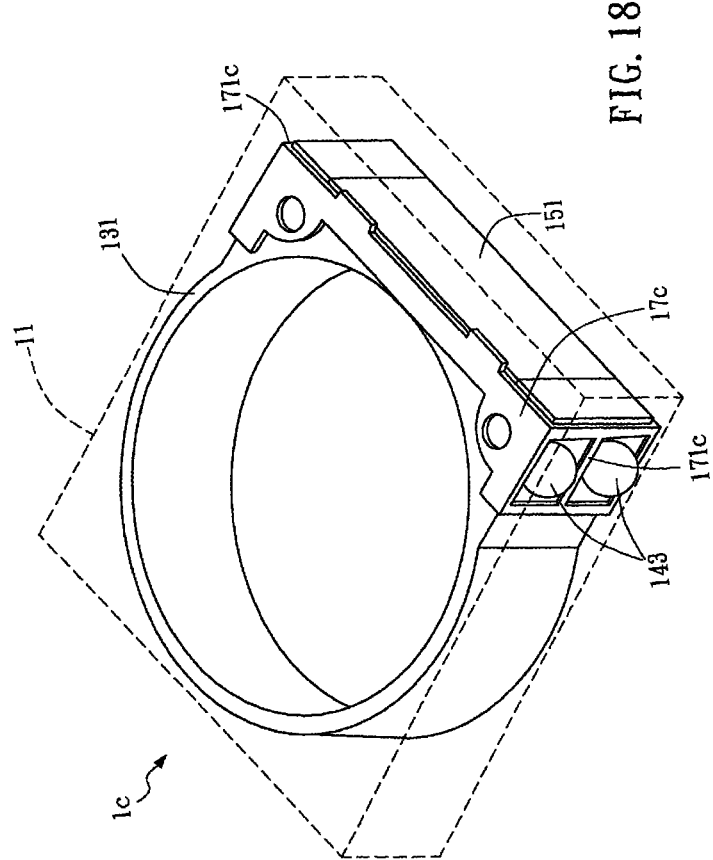
FIG. 18 shows a schematic application state of the constraint member of a fourth embodiment of the electromagnetic driving device for lens having an anti-tilt mechanism in accordance with the present invention.

Referring now to FIG. 18, a schematic application state of the constraint member of a fourth embodiment of the electromagnetic driving device for lens having an anti-tilt mechanism in accordance with the present invention is shown. For the fourth embodiment of FIG. 18 is mostly resembled to the second embodiment of FIG. 8, thus elements of the fourth embodiment which are the same as those of the second embodiment would be omitted herein. The major difference between the second embodiment 1a of FIG. 8-FIG. 12 and the fourth embodiment 1c of FIG. 18 is that, in this fourth embodiment 1c, the electromagnetic driving device for lens having an anti-tilt mechanism 1c further includes a constraint member 17c formed as a frame located inside the casing 11 and fitted onto the lens carrier 131. Opposing ends of the constraint member 17c are individually formed as respective corner plate structures, each of which has two carved window holes 171c (or mountain-shape holes) for feeding the corresponding rolling members 143 of the respective groove 141 or 141'. Through the separate window holes 171c of the constraint member 17c existed between the lens carrier 131 and the casing 11, each of the rolling members 143 (rolling balls) can be isolated to avoid possible inter-ball collisions. Upon such an arrangement, the contact points of the rolling members 143 on the lens carrier 131 can be further adjusted to provide satisfied pivoting functions. Also, the constraint member 17c can also fix the magnetic member 151 firmly onto the driven object 13 (the lens module). In the present invention, the constraint member 17c can be a magneto-conductive material or a non-magneto-conductive material.

Referring now to FIG. 19, a schematic application state of the constraint member of a fifth embodiment of the electromagnetic driving device for lens having an anti-tilt mechanism in accordance with the present invention is shown. For the fifth embodiment of FIG. 19 is mostly resembled to the second embodiment of FIG. 8, thus elements of the fourth embodiment which are the same as those of the second embodiment would be omitted herein. The major difference between the second embodiment 1a of FIG. 8-FIG. 12 and the fifth embodiment 1d of FIG. 19 is that, in this fifth embodiment 1d, the electromagnetic driving device for lens having an anti-tilt mechanism 1d further includes a constraint member 17c formed as a frame structure located inside the casing 11 and embedded onto the frame 12. Opposing ends of the constraint member 17c are individually formed as respective legs 172 to protrude into the respective groove 141, 141' for separating the rolling members 143 thereinside so as to avoid inter-ball collisions (able to degrade the pivoting functions) between the neighboring rolling members 143. Upon such an arrangement, the contact points of the rolling members 143 on the lens carrier 131 can be further adjusted to provide stable and satisfied pivoting functions. Also, in the present invention, the constraint member 17d can be a magneto-conductive material or a non-magneto-conductive material.

In summary, the electromagnetic driving device for lens having an anti-tilt mechanism according to the present structure defined with an X axis, a Y axis and a Z axis includes a casing 11, a frame 12, a driven object 13, an anti-tilt mechanism 14, an electromagnetic driving module 15 and a position-detecting module 16. The electromagnetic driving module 15 further includes a magnetic member 151, a coil 152 and a circuit board 153. The position-detecting module 16 further includes a position detector 161 and a target 162. The casing 11 housing the frame 12 so as to form, inside the frame 12, an inner compartment 110. The driven object 13 received inside the inner compartment 110 is movable along the Z axis in the casing 11.

In the present invention, the casing 11 housing or shielding the frame 12 so as to form, inside the frame 12, the inner compartment 110 to receive the driven object 13 thereinside movable along the Z axis in the casing 11 as well as in the frame 12. The magnetic member 151 and the coil 152 are attached on the driven object 13 and the frame 12, respectively. By providing the circuit board 153, currents can be applied to energize the coil 152 so as to further shift the driven object 13. The position detector 161 is fixed to the circuit board 153, and the target is located exteriorly at the lens carrier 131 at a position facing the position detector 161. By providing the fixed position detector 161 to detect the target moving synchronically with the lens carrier 131, the Z-axial displacement of the lens module inside the inner compartment can thus be calculated. Together, the anti-tilt mechanism 14 can thus eliminate possible kinetic tilt of the driven object 13 in the X-axial or Y-axial direction while in moving along the Z-axial direction and therefore maintain the high quality of optics when performing image-capturing.

While the present invention has been particularly shown and described with reference to a preferred embodiment, it will be understood by those skilled in the art that various changes in form and detail may be without departing from the spirit and scope of the present invention.

What is claimed is:

1. An electromagnetic driving device for lens having an anti-tilt mechanism, defined with an X axis, a Y axis and a Z axis, comprising:
   a casing;
   a frame, housed by the casing so as to form an inner compartment thereinside;
   a driven object, received inside the inner compartment, allowed to shift in the casing along the Z axis;
   a driving module, located between the casing and the driven object, used to drive the driven object to shift in the casing along the Z axis; and
   an anti-tilt mechanism, located at the frame at a position respective to the driven object, used to eliminate X-axial or Y-axial gaps around the driven object inside the inner compartment;
   wherein said anti-tilt mechanism further includes two opposing grooves located at a rim of the driven object, a constraint block located at the frame, a plurality of rolling members and an elastic pre-stress structure, a number of the rolling members being feed inside a space formed by one of the grooves and the constraint block while the other rolling members are feed inside another space formed by another one of the grooves and the elastic pre-stress structure, wherein the two grooves and the constraint block are extended in directions parallel to the Z axis;
   wherein said groove is one of a V-shape race and a U-shape race, the constraint block is one of a concave V-shape race or a concave U-shape race, X-axial and Y-axial kinetic tilt of the driven object while in moving inside the inner compartment along the Z axis are eliminated by having the elastic pre-stress structure to depress the respective rolling members in the corresponding groove, and the rolling member is one of at least one rolling ball, at least one rolling pin, at least one slippery rod and at least one cam;
   further including a constraint member formed as a frame located inside the casing to separate the rolling members and so as to avoid possible collisions by adjusting contact points of the rolling members on the driven object, wherein the constraint member is one of a magneto-conductive material and a non-magneto-conductive material; and
   wherein the elastic pre-stress structure further includes:
      a loosen-fit backing plate, being loosely fit into an opening of the frame, the opening communicating in space with the inner compartment, the loosen-fit backing plate further having a slippery rack respective to one of the grooves of the lens module, the slippery rack being one of a V-shaped race and a U-shaped race; and
      a spring plate, further having an X-directional spring plate and a Y-directional spring plate extending perpendicular to the X-directional spring plate, the X-directional spring plate being located in a slim space between the inner loosen-fit backing plate and the outer casing, the Y-directional spring plate being extended into a predetermined backlash at one side of the opening and between the loosen-fit backing plate and the frame;
   wherein, by providing the slippery rack and the corresponding groove to feed therebetween the rolling members, by having the X-direction spring plate of the spring plate to elastically depress the loosen-fit backing plate onto the driven object, and further by having the Y-direction spring plate to elastic fill the backlash between the loosen-fit backing plate and the frame, both the X-axial and Y-axial gaps (kinetic tilt) between the lens module and the frame while the driven object shift along the Z axis inside the inner compartment are substantially eliminated.

2. The electromagnetic driving device for lens having an anti-tilt mechanism according to claim 1, wherein said driving module is an electromagnetic driving module further having a magnetic member, a coil and a circuit board, the magnetic member and the corresponding coil being located respectively to the driven object and the frame;
   wherein, by utilizing the circuit board to energize the coil, an induced magnetic force is applied to the magnetic member so as thereby to drive the driven object to shift in the casing along the Z axis;
   wherein, while the driven object is moving, the anti-tilt mechanism is to eliminate the kinetic tilt of the driven object.

3. The electromagnetic driving device for lens having an anti-tilt mechanism according to claim 2, wherein said circuit board is an L-shape circuit board having a coil-layout portion and a detection-layout portion perpendicular to the coil-layout portion, the coil-layout portion being electrically coupled with the coil and located at a position respective to the magnetic member at the driven object, wherein the magnetic member is a magnet.

4. The electromagnetic driving device for lens having an anti-tilt mechanism according to claim 3, further including a position-detecting module further having a position detector and a target, the position detector being mounted on the detection-layout portion of the circuit board, the target being mounted on the driven object at a position respective to the position detector, wherein the position-detecting module is one of a Hall element, a magneto-resistive sensor and an optical position sensor.

5. The electromagnetic driving device for lens having an anti-tilt mechanism according to claim 1, wherein said driven object is a lens module further having a lens carrier and a lens, the lens being located at a center of the lens carrier and synchronically moved with the lens carrier.

6. The electromagnetic driving device for lens having an anti-tilt mechanism according to claim 1, wherein the constraint member further has two opposing ends, each of the two opposing ends being formed as one of a extrusion leg and a corner plate structure having carved window holes, thereby collisions between two neighboring rolling members being avoided and contact points between the rolling members and the driven object being adjusted by separating rolling members.

7. An electromagnetic driving device for lens having an anti-tilt mechanism, defined with an X axis, a Y axis and a Z axis, comprising:
   a casing;

a frame, housed by the casing so as to form an inner compartment thereinside;

a driven object, received inside the inner compartment, allowed to shift in the casing along the Z axis;

a driving module, located between the casing and the driven object, used to drive the driven object to shift in the casing along the Z axis; and an anti-tilt mechanism, located at the frame at a position respective to the driven object, used to eliminate X-axial or Y-axial gaps around the driven object inside the inner compartment;

wherein said anti-tilt mechanism further includes two opposing grooves located at a rim of the driven object, a constraint block located at the frame, a plurality of rolling members and an elastic pre-stress structure, a number of the rolling members being feed inside a space formed by one of the grooves and the constraint block while the other rolling members are feed inside another space formed by another one of the grooves and the elastic pre-stress structure, wherein the two grooves and the constraint block are extended in directions parallel to the Z axis;

wherein said groove is one of a V-shape race and a U-shape race, the constraint block is one of a concave V-shape race or a concave U-shape race, X-axial and Y-axial kinetic tilt of the driven object while in moving inside the inner compartment along the Z axis are eliminated by having the elastic pre-stress structure to depress the respective rolling members in the corresponding groove, and the rolling member is one of at least one rolling ball, at least one rolling pin, at least one slippery rod and at least one cam; and wherein the elastic pre-stress structure has one fixation end and one spring end, the fixation end being fixed to the frame, the spring end being used to elastically depress the rolling members onto the driven object.

\* \* \* \* \*